United States Patent [19]

Mills et al.

[11] Patent Number: 5,630,041

[45] Date of Patent: May 13, 1997

[54] SYSTEM FOR PERMANENTLY RETAINING MULTI DIMENSIONAL CAD PART INFORMATION IN THE FORM OF A TAG WITHIN A PART FILE

[75] Inventors: R. Steven Mills, Austin; Ty R. Schmitt, Round Rock, both of Tex.

[73] Assignee: Dell USA, L.P., Round Rock, Tex.

[21] Appl. No.: 494,272

[22] Filed: Jun. 23, 1995

[51] Int. Cl.$^6$ ................................................ G06T 17/40
[52] U.S. Cl. .............. 395/141; 364/474.24; 364/468.04; 364/468.03; 395/615
[58] Field of Search ................................ 364/522, 468, 364/474.24; 382/8; 365/600; 395/119, 115, 125, 141

[56] References Cited

U.S. PATENT DOCUMENTS

| | | | |
|---|---|---|---|
| 4,928,233 | 5/1990 | Millis | 364/522 |
| 4,998,206 | 3/1991 | Jones et al. | 364/468 |
| 5,231,675 | 7/1993 | Sarr et al. | 382/8 |
| 5,268,999 | 12/1993 | Yokoyama | 395/141 |
| 5,452,219 | 9/1995 | Dehoff et al. | 364/474.05 |
| 5,493,679 | 2/1996 | Virgil et al. | 395/615 |
| 5,546,313 | 8/1996 | Masters | 364/468.04 |
| 5,552,995 | 9/1996 | Sebastian | 364/468.03 |

Primary Examiner—Thomas G. Black
Assistant Examiner—Charles Rones
Attorney, Agent, or Firm—Skjerven, Morrill, MacPherson, Franklin & Friel; Stephen A. Terrile

[57] ABSTRACT

A representation of a three dimensional part is provided with a three dimensional part summary information tag. Thus advantageously allowing part summary information to be easily accessible and visible to users who access the part data file.

25 Claims, 4 Drawing Sheets

SYSTEM FOR PERMANENTLY RETAINING MULTI DIMENSIONAL CAD PART INFORMATION IN THE FORM OF A TAG WITHIN A PART FILE

FIELD OF THE INVENTION

The present invention relates to data files containing part information and more particularly, to data files containing part information as well as related part summary information.

BACKGROUND OF THE INVENTION

When designing mechanical parts, it is known to use computer aided design/computer aided manufacturing (CAD/CAM) tools such as the computer aided design tool available from Parametric Technology Corp (PTC) under the trade designation Pro/ENGINEER. Other examples of CAD tools include the AUTOCAD, CADKEY, INTERGRAPH and ANVIL CAD tools. Computer aided design tools produce data files which contain multi-dimensional part information necessary for fabricating the mechanical part. The data files are often stored in the form of a database. After the mechanical part is designed, the data file representing the part is often transferred to another location, e.g., the location of a vendor, where the part is fabricated. It is desirable for the CAD tool to provide the data file in a format which is an easily accessible and readable file format; i.e., in a format which is accessible by different types of CAD and fabrication tools.

One common file format which provides the attributes of being easily accessible and readable is the Initial Graphics Exchange Specification (IGES) format. Files conforming to the IGES format contain all of the multi-dimensional information necessary to fabricate the part. However, the IGES format does not contain easily accessible textual information such as part summary information. This part summary information may include the part number of the mechanical part, the revision level of the mechanical part and the date. The part summary information may also include the part volume.

Accordingly, a variety of other methods may be used in transferring the part summary information with the part data file. For example, the part summary information may be faxed to the vendor when the data file is sent by modem to the vendor, the part summary information may be sent by electronic mail which is attached to the data file, the part summary information may be written on a diskette on which the data file is stored, the part summary information may be shown on a drawing which accompanies the data file or the part summary information may be verbally communicated to the vendor. However, in each of these methods, because the part summary information is not attached to the data file, the part summary information may be easily separated from the data file. Additionally, a vendor may have several versions of data files for the same mechanical part, thus making it difficult to determine which is the latest version of the part.

The IGES file format includes a provision for providing a text header within the IGES data file. However, this provision requires that the IGES data file be opened as a text file to look at the text header. To access this information, the user must know that the text header including the part summary information is present. Additionally, when the IGES data file is accessed and converted to a file format which conforms to the CAD system of a vendor, the IGES text header is disconnected from the IGES data file and thus is not available to the vendor.

SUMMARY OF THE INVENTION

It has been discovered that providing a representation of a multi-dimensional part with a multi-dimensional part summary information tag advantageously allows part summary information to be easily accessible and visible to users who access the part data file.

It has also been discovered that storing in a part data file a representation of a multi-dimensional part along with a representation of a multi-dimensional part summary information tag advantageously allows transfer of the part summary information in a way which is easily accessible to users who access the part data file.

In a preferred embodiment, the invention relates to a method for retaining part information for a part having a part geometry where the part geometry is stored within a geometry data file of a part data file. The method includes the steps of accessing the geometry data field of the part data file, generating a part information tag, the part information tag having a part information tag geometry, coupling the part information tag to the part geometry, and saving the part geometry and the part information tag within the part data file.

In another preferred embodiment, the invention relates to a system for retaining part information for a part where the part corresponds to a part data file. the system includes a non-volatile memory which is readable by a computer system, a geometry data field stored on the non-volatile memory and an informational data field stored on the non-volatile memory. The geometry data field stores multi-dimensional part information. The informational data field stores multi-dimensional information. The information data field is coupled to the geometry data field.

In another preferred embodiment, the invention relates to a method of presenting part information to a user of a computer system. The computer system includes a processor, memory coupled to the processor, and a screen coupled to the processor and the memory. The method includes the steps of presenting on the screen a screen presentation of a part having a part geometry corresponding to a geometry data field, and presenting on the screen a part information tag corresponding to a informational data field, the information data field being coupled to the geometry data field.

DETAILED DESCRIPTION

The following sets forth a detailed description of the best contemplated mode for carrying out the invention. The description is intended to be illustrative of the invention and should not be taken to be limiting.

Figure 1:
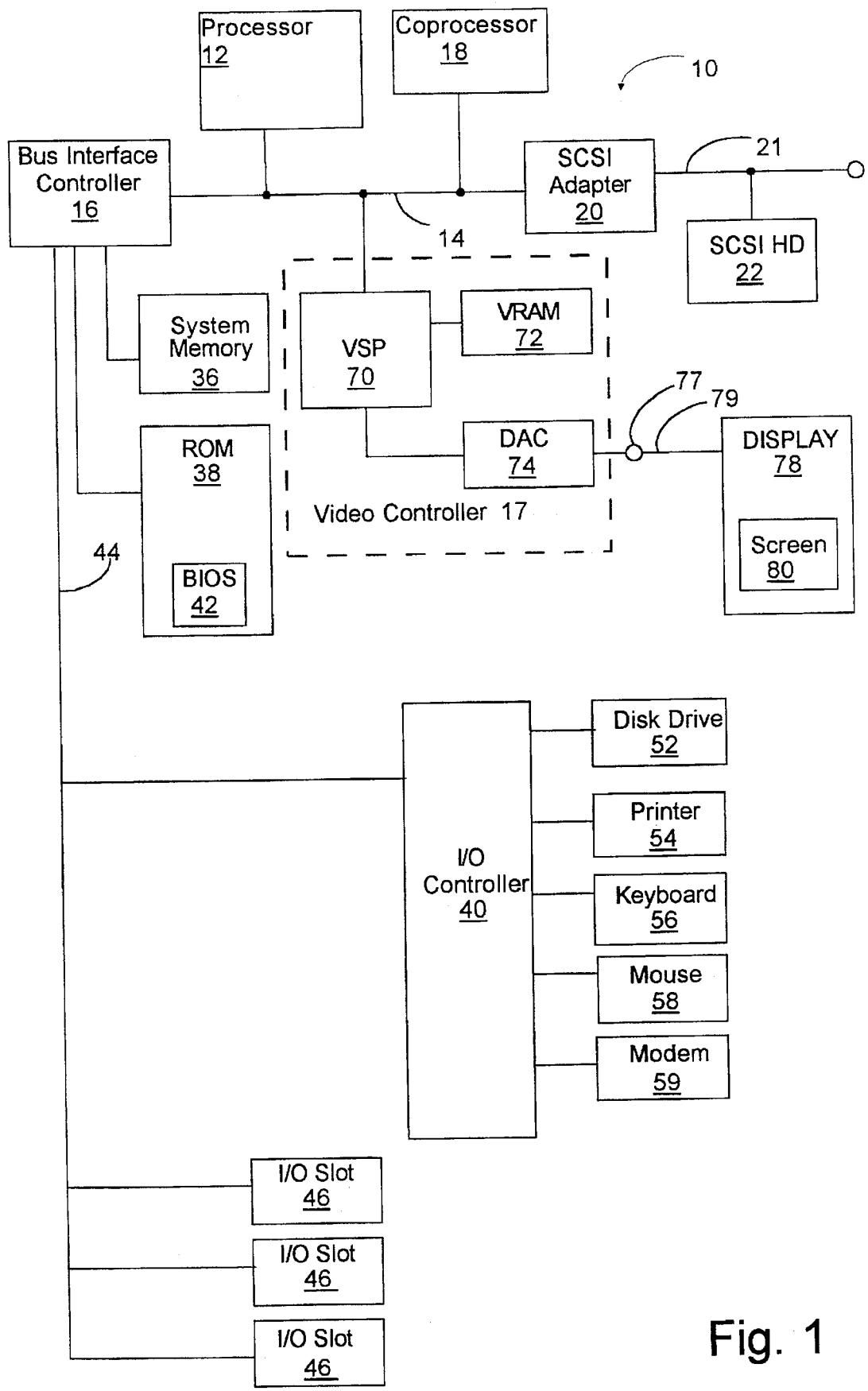
FIG. 1 shows a block diagram of a computer system having a data file in accordance with the present invention.

Referring to FIG. 1, personal computer system 10 which generates and uses part information in accordance with the present invention is shown. Computer system 10 includes processor 12, coupled to local bus 14 which, in turn, is coupled to bus interface controller 16, coprocessor 18, video controller 17 and small computer system interface (SCSI) adapter 20. Processor 12 is preferably a microprocessor from the family of x86 processors, such as a Pentium microprocessor available from Intel Corporation, Santa Clara, Calif.

Local bus 14 includes conventional data, address and control lines conforming to, for example, the peripheral connect interface (PCI) architecture. SCSI adapter 20 couples local bus 14 to SCSI bus 21 to which SCSI devices such as a SCSI hard drive 22 may be coupled. Host unit 11 also includes system memory 36, non-volatile memory 38 and I/O controller 40, which are all coupled to bus interface controller 16.

Bus interface controller 16 performs two primary functions. The first function that bus interface controller 16 performs is as a memory controller for accessing main system memory 36 and nonvolatile memory 38. Main system memory 36 is a dynamic random access memory (RAM) which includes one or more single, in-line memory modules (SIMMS) and stores programs and data for execution by system processor 12 and coprocessor 18. Nonvolatile memory 38 is, e.g., a read only memory (ROM) which stores microcode including the basic input output system (BIOS) 42 of computer system 10.

BIOS 42 is a microcode software interface between an operating system or application programs and the hardware of system 10. The operating system and application programs access BIOS 42 rather than directly manipulating I/O ports and control words of the specific hardware. BIOS 42 is accessed through an interface of software interrupts and contains a plurality of entry points corresponding to the different interrupts. In operation, BIOS 42 is loaded from ROM 38 to system memory 36 and is executed from system memory 36.

The second function that bus interface controller 16 performs is as an interface between bus 14 and input/output (I/O) bus 44. I/O bus 44 conforms to the industry standard architecture (ISA) standard, which is also sometimes referred to as the AT bus standard. Bus 44 is further coupled to I/O controller 40, and a plurality of I/O slots 46, into which a variety of I/O or expansion cards (not shown) may be inserted.

I/O controller 40 is also coupled to and controls the operation of disk drive 52, printer 54, keyboard 56 and mouse 58. I/O controller 40 also includes a modem port to which a modem 59 may be optionally connected.

Video controller 17, which is coupled to local bus 14, includes video signal processor (VSP) 70, video RAM (VRAM) 72 and digital to analog converter (DAC) 74. Video signal processor 48 is coupled to video RAM (VRAM) 60 and to digital to analog converter (DAC) 62. Digital to analog converter 66 is coupled display terminal 77. Display 78, which is a computer display device conforming to, e.g., the super video graphics array (SVGA) standard, is coupled to display terminal 77 via display cable 79. Display 78 includes screen 80 on which video information is presented.

Figure 2:
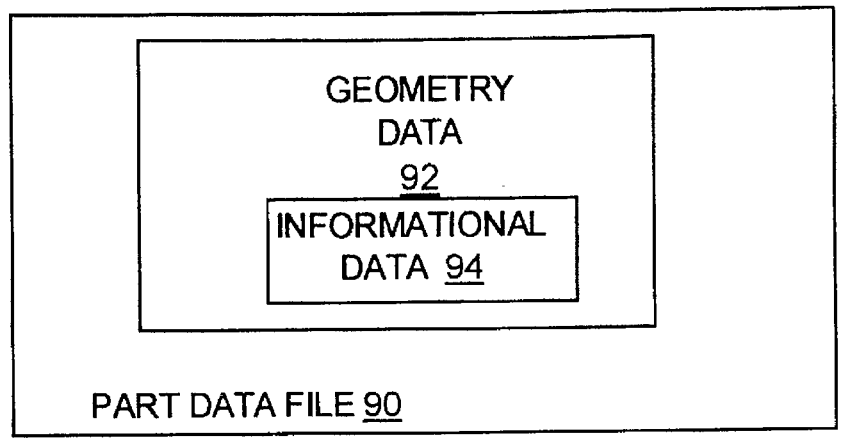
FIG. 2 shows a block diagram of a part data file in accordance with the present invention.

FIG. 2 shows part data file 90 which includes geometry data field 92. Geometry data field 92 further includes informational data field 94. Geometry data field 92 of part data file 90 stores all of the three dimensional information necessary to fabricate a part corresponding to the part data file. Informational data field 94 includes critical part information which is stored as three dimensional information. Part data file 90 conforms to a standard file format such as the IGES file format for transferring three dimensional part data. Because informational data field 94 is stored within geometry data field 92 as three dimensional information, the critical part information is permanently linked to the part geometry which is contained in geometry data field 92. Informational data field 94 is stored as a separate layer from the layer in which the three dimensional information necessary to fabricate the part is stored.

Part data file 90 is stored on a non-volatile memory such as disk drive 52. When part data file 90 is to be accessed, such as when the part data file is modified or the part corresponding to part data file 90 is to be manufactured, part data file 90 is moved from the non-volatile memory to system memory 36. A program, such as a computer aided design (CAD) program, which is executing on processor 12, then accesses part data file 90 from memory 36.

Figure 3:
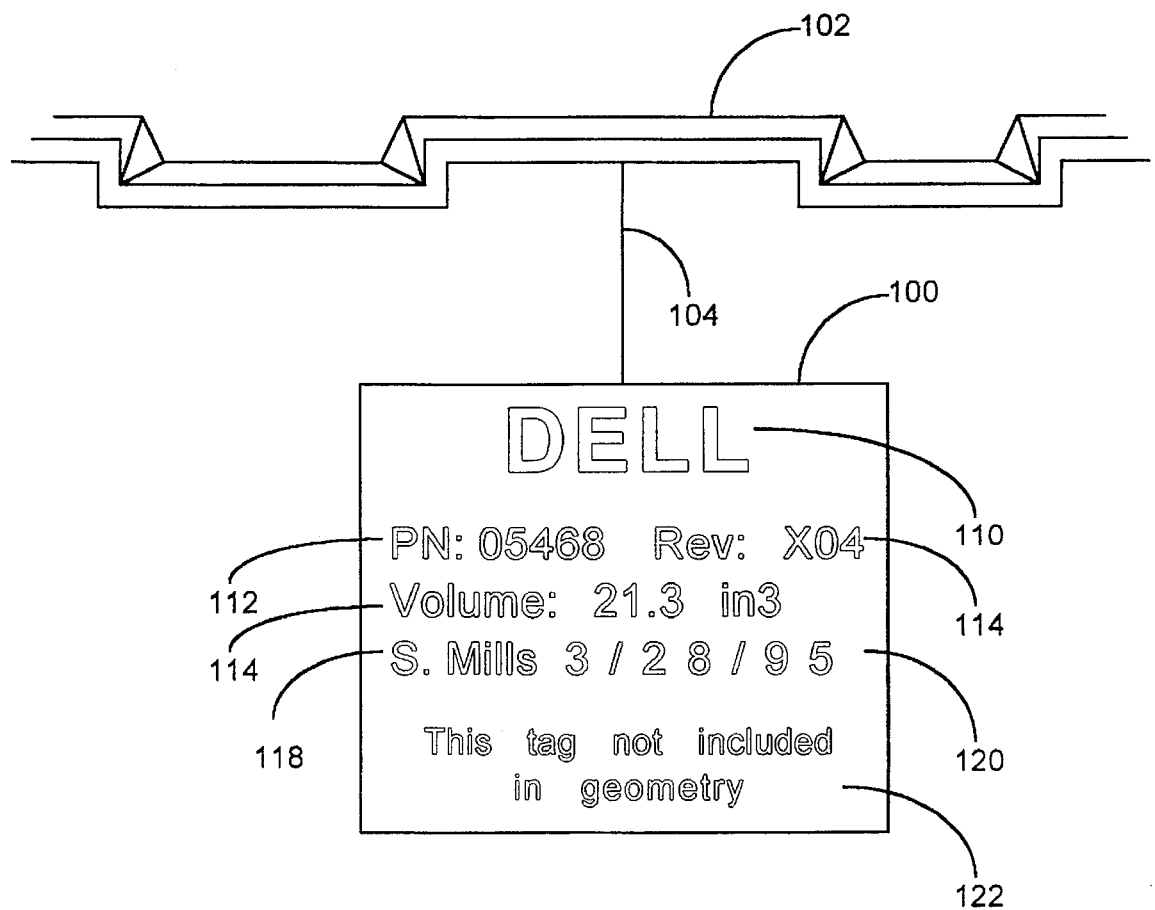
FIG. 3 shows an example of a part information tag in accordance with the present invention.

FIG. 3 shows an example of a screen presentation of part information tag 100 coupled to part geometry 102. The screen presentation is presented, for example, on screen 80 of display device 78 under control of processor 12. Part information tag 100 has a volume so as to be three-dimensional. I.e., part information tag 100 has a height, width and depth which combine to provide a volume. Part information tag 100 is coupled to part geometry 102 via thread 104. Thread 104 also has a volume. Additionally, part information tag 100 is stored as a separate layer from the layer in which part geometry 102 is stored. Thus part information tag 100 may be suppressed (i.e., not presented on screen 80) by suppressing the layer on which part information tag 100 is stored.

The relative size, and especially the depth, of information tag 102 is small when compared to the size of part geometry 102. Additionally, the relative size of thread 104 is small when compared to the size of part geometry 102 (e.g., 1/1000 of the largest part geometry size). For example, depth of information tag 102 is 0.005" and the size of thread 104 is 0.005" square. Accordingly, tag 102 and thread 104 are difficult, if not almost impossible, to reproduce. Thus, it is obvious to a vendor which is producing a part based upon the part geometry stored within part data file 90 that the information tag 102 and thread 104 are not intended to be reproduced.

Information tag 102 includes critical information relating to the part corresponding to part data file 90. This information includes manufacturer information 110 which sets forth the manufacturer of the part corresponding to the part data file, part number information 112 which sets forth the particular part number of the part corresponding to the part data file, revision number information 114 which sets forth the revision number of the part corresponding to the part data file, volume information 116 which sets forth the volume of the part corresponding to the part data file, contact information 118 which sets for the contact person for the part corresponding to the part data file and date information 120 which sets forth the date the present revision level of the part corresponding to the part data file was completed. Information tag 102 also includes exclusion statement 122 setting forth that information tag 102 is not actually part of the part geometry. Thus, clearly setting forth that the part information tag is not intended to be fabricated when the part is fabricated from the part data file.

Figure 4:
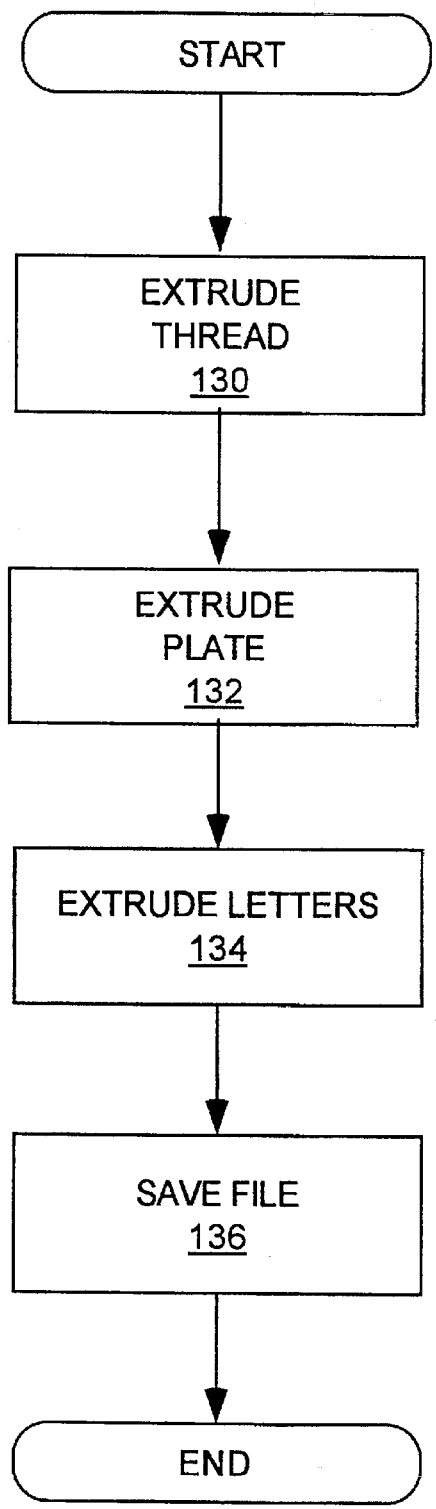
FIG. 4 shows a flow chart of a method of generating a part information data tag in accordance with the present invention.

FIG. 4 shows a flow chart of the method of generating part information data tag 100. Part information tag 100 is generated by first generating an extrusion of thread 104 at extrude thread step 130. The extrusion is initiated and attached to the part geometry. The size of the extrusion of the thread is small with reference to the size of the part geometry. After the extrusion of the thread is generated, a plate, which is a three dimensional object that will be used to create an information tag, is generated by an extruding a plate at extrude plate step 132. The plate has a small depth with reference to the size of the part. After the plate is extruded, alphanumeric characters, e.g., letters, are generated by extruding the characters from the plate at extrude letters step 134. The letters are extruded using a letter extrusion routine that is included within the CAD design package. After the letters are extruded, the information tag is saved to memory at save step 136. This information tag can then be used as a sample baseline tag when generating other tags for other part geometries.

Figure 5:
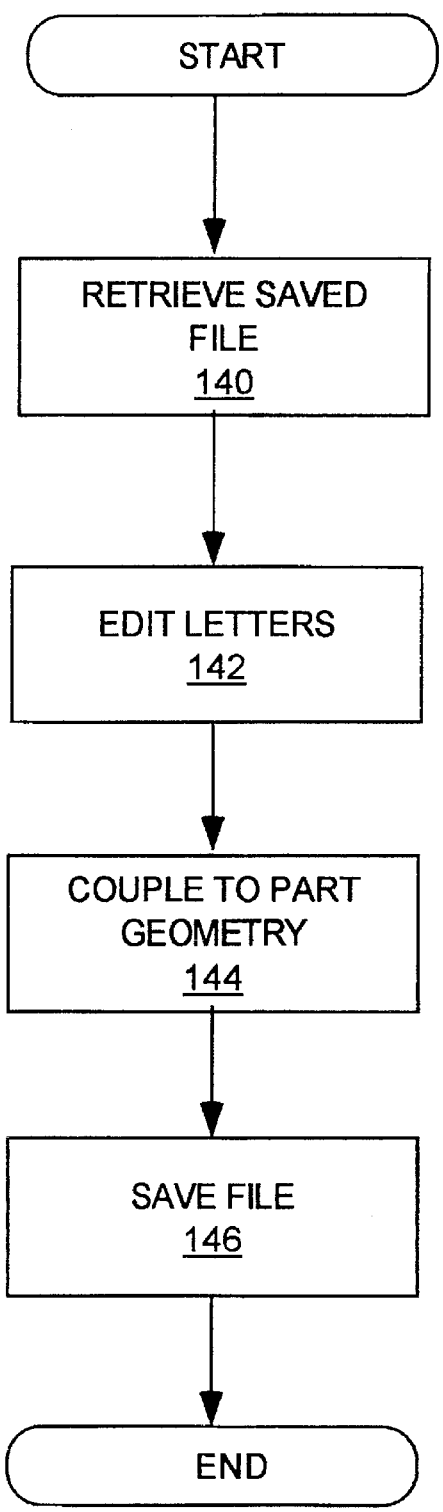
FIG. 5 shows a flow chart of a method of generating a part information data tag from a sample tag in accordance with the present invention.

For example, FIG. 5 shows a flow chart of the method of generating part information data tag 100 from a saved informational data file such as that saved when performing the method of the flow chart of FIG. 4. The method starts by retrieving the sample file at step 140. After the file is retrieved, a user edits the letters and numerals of the sample file at edit step 142. In addition to editing the letters, the part information data tag is attached to the corresponding part geometry at couple step 144. After the sample file is edited and the tag is attached to the corresponding part geometry, the part data file is saved to include the informational data file corresponding to the part at save step 146.

OTHER EMBODIMENTS

Other embodiments are within the following claims.

Figure 6:
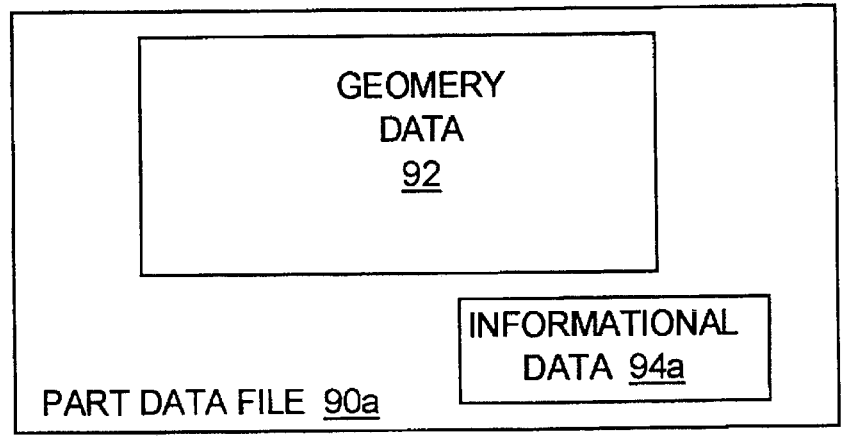
FIG. 6 shows an alternate part data file in accordance with the present invention.

For example, FIG. 6 shows alternate part data file 90a. Part data file 90a includes geometry data field 92 as well as information data field 94a. Geometry data field 92 of part data file 90 stores all of the three dimensional information necessary to fabricate a part corresponding to the part data file. Informational data field 94a includes critical part information which is stored as three dimensional information. Part data file 90 conforms to a standard file format such as the IGES file format for transferring three dimensional part data. However, the IGES file format is modified to include an easily accessible, i.e., accessible as three dimensional data, informational data portion field which is logically linked to geometry data field 92. This easily accessible informational data portion field is accessible via, for example, a window that is included when the geometry data portion is presented on a screen. Because informational data field 94a is easily accessible and is logically linked to geometry data field 92, the critical part information which is stored in information data portion 92a is permanently linked to the part geometry which is contained in geometry data field 92. Alternately, for example, the easily accessibly informational data may be visually linked to the part geometry as a part information tag. The visually linked tag may be selectively toggled on or off so that this tag is selectively presented.

Also, for example, part data file may include a plurality of information data fields. Accordingly, the plurality of information data fields may provide separate part information. Also for example, the plurality of information data fields may correspond to a plurality of information data tags, the tags being coupled to different locations of the part geometry.

What is claimed is:

1. A method for retaining part information for a part having a part geometry, the part geometry being stored within a geometry data file of a part data file, the method comprising the steps of accessing the geometry data filed of the part data file, generating a part information tag, the part information tag having a part information tag geometry, the generating step including:

generating a plate having a depth which is small when compared to the part geometry of the part;

coupling the part information tag to the part geometry; and saving the part geometry and the part information tag within the part data file.

2. The method of claim 1 wherein the generating step further includes generating a thread having a size which is small when compared to the part geometry of the part, and the coupling step includes attaching the thread to the part geometry, and attaching the thread to the plate.

3. The method of claim 1 wherein the generating step further includes generating alphanumeric characters, the alphanumeric characters being attached to the plate.

4. The method of claim 1 wherein the part data file conforms to the initial graphics exchange specification (IGES) format.

5. The method of claim 1 further comprising generating a plurality of part information tags, each of the plurality of part information tags includes respective part information tag geometries.

6. A system for retaining part information for a part, the part corresponding to a part data file, the system comprising a non-volatile memory, the non-volatile memory being readable by a computer system, a geometry data field stored on the non-volatile memory in said part data file, the geometry data field storing multidimensional part information, and an informational data field stored on the non-volatile memory in said part data file, the information data field being multi-dimensional, the information data field being coupled to the geometry data field.

7. The system of claim 6 wherein the multi-dimensional part information is three dimensional part information.

8. The system of claim 7 wherein the multi-dimensional informational data field includes three dimensional informational data.

9. The system of claim 6 wherein the informational data field includes critical part information.

10. The system of claim 9 wherein the critical part information includes manufacturer information, the manufacturer information setting forth a manufacturer of the part.

11. The system of claim 9 wherein the critical part information includes part number information, the part number information setting forth a part number of the part.

12. The system of claim 9 wherein the critical part information includes revision number information, the revision number information setting forth a revision number of the part.

13. The system of claim 9 wherein the critical part information includes volume information, the volume information setting forth a volume of the part.

14. The method of claim 9 wherein the critical part information includes exclusion information, the exclusion information indicating that the information data field is not part of the part geometry.

15. The method of claim 6 wherein the part data file conforms to the initial graphics exchange specification (IGES) format.

16. The system of claim 6 further comprising a informational data fields, each of the plurality of part information tags being multi-dimensional and being coupled to the geometry data field.

17. A method of presenting part information to a user of a computer system, the computer system including a processor, memory coupled to the processor, and a screen coupled to the processor and the memory, the method comprising the steps of:

presenting on the screen a screen presentation of a part having a part geometry corresponding to a geometry data field, presenting on the screen a part information tag corresponding to an informational data field, the information data field being coupled to the geometry data field, the geometry data field and the information data field being stored within a part data file.

18. The method of claim 17 further comprising presenting the part information tag coupled to the part via a thread, wherein the size of the part information tag and the thread are small with reference to the size of the part.

19. The method of claim 17 wherein the part information tag has a volume, the volume of the part information tag being small with reference to the size of the part.

20. The system of claim 17 wherein the part information tag includes critical part information.

21. The system of claim 20 wherein the critical part information includes manufacturer information, the manufacturer information setting forth a manufacturer of the part.

22. The system of claim 21 wherein the critical part information includes part number information, the part number information setting forth a part number of the part.

23. The system of claim 21 wherein the critical part information includes revision number information, the revision number information setting forth a revision number of the part.

24. The system of claim 21 wherein the critical part information includes volume information, the volume information setting forth a volume of the part.

25. The method of claim 21 wherein the critical part information includes exclusion information, the exclusion information setting forth that the information data field is not part of the part geometry.

\* \* \* \* \*